United States Patent [19]

Marrs et al.

[11] Patent Number: 4,984,752
[45] Date of Patent: Jan. 15, 1991

[54] SAFETY BELT RETRACTOR AND METHOD OF MANUFACTURE

[75] Inventors: Samuel M. Marrs, Bourbonnais; Victor Herodes, Worth; David Ransom, Bonfield, all of Ill.

[73] Assignee: Occupant Safety Systems Inc., Olympia Fields, Ill.

[21] Appl. No.: 347,355

[22] Filed: May 4, 1989

[51] Int. Cl.⁵ .............................................. B60R 22/40
[52] U.S. Cl. .............................. 242/107.4 A; 72/379.2
[58] Field of Search ............... 242/107.4 A; 280/806; 297/478, 480; 72/379

[56] References Cited

U.S. PATENT DOCUMENTS

| 3,489,367 | 1/1970 | Kovacs et al. | 242/107.4 A |
|---|---|---|---|
| 3,946,965 | 3/1976 | Singh | 242/107.4 A |
| 4,015,796 | 4/1977 | Higbee | 240/107.4 A |
| 4,394,993 | 7/1983 | Stamboulian et al. | 242/107.4 A |
| 4,529,145 | 7/1985 | Befort | 242/107.4 A |
| 4,566,649 | 1/1986 | Petersen | 242/107.4 A |

Primary Examiner—John M. Jillions
Attorney, Agent, or Firm—Fitch, Even, Tabin & Flannery

[57] ABSTRACT

A seat belt retractor that is sensitive to vehicle movements is provided, having a frame for mounting a reel about which the safety belt is wound. A frame also mounts a pawl which selectively blocks rotation of the reel to prevent payout of a seat belt when a predetermined condition of the vehicle is sensed. The frame includes a support plate integrally formed therewith and including a bearing seat for mounting an inertia member for actuating the pawl, thus locking the reel against rotation. A method of constructing the retractor frame with an integral support for the inertia member is also disclosed.

12 Claims, 4 Drawing Sheets

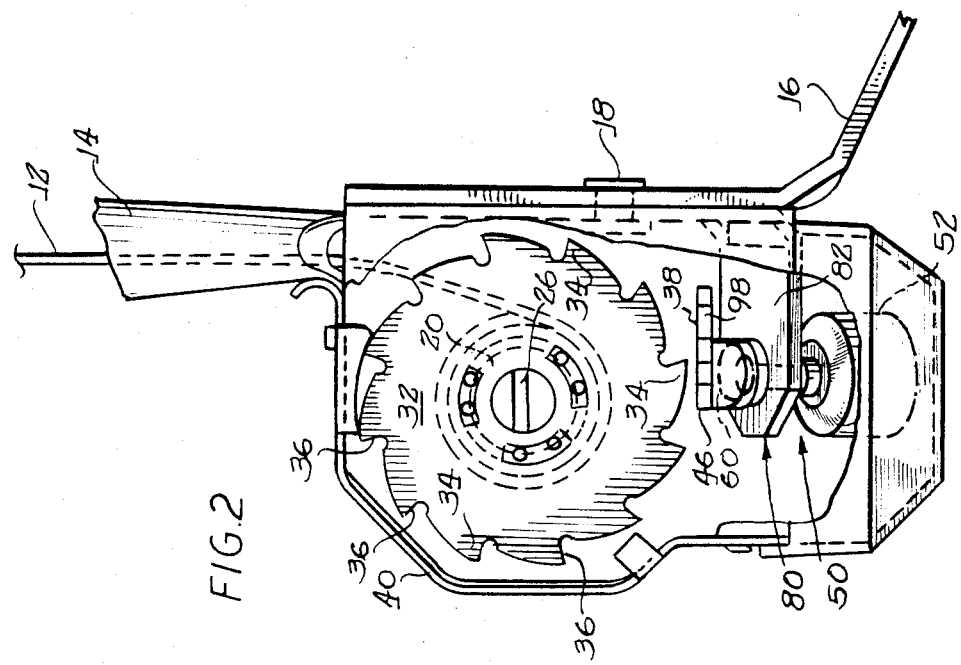
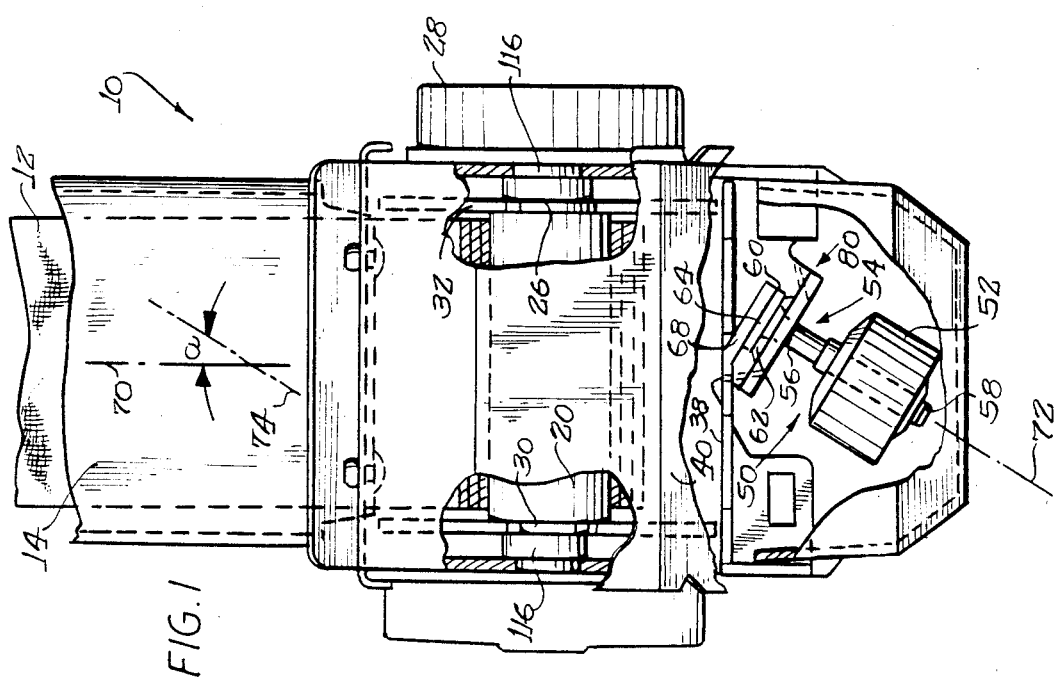

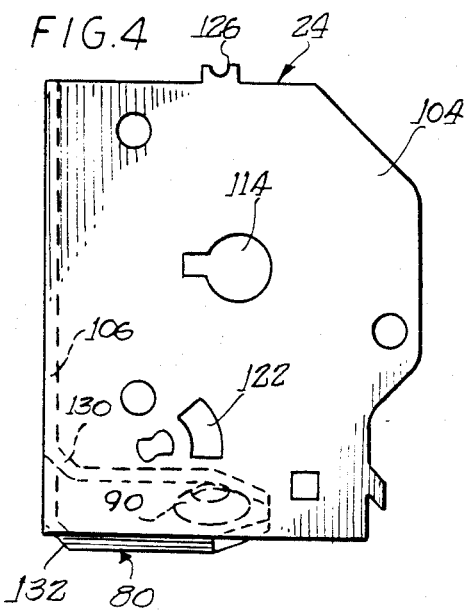
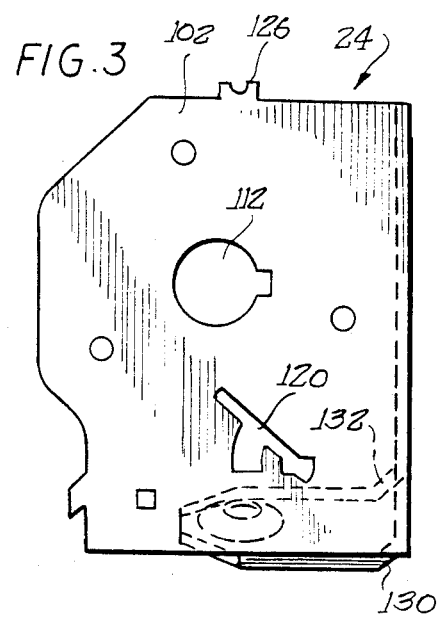
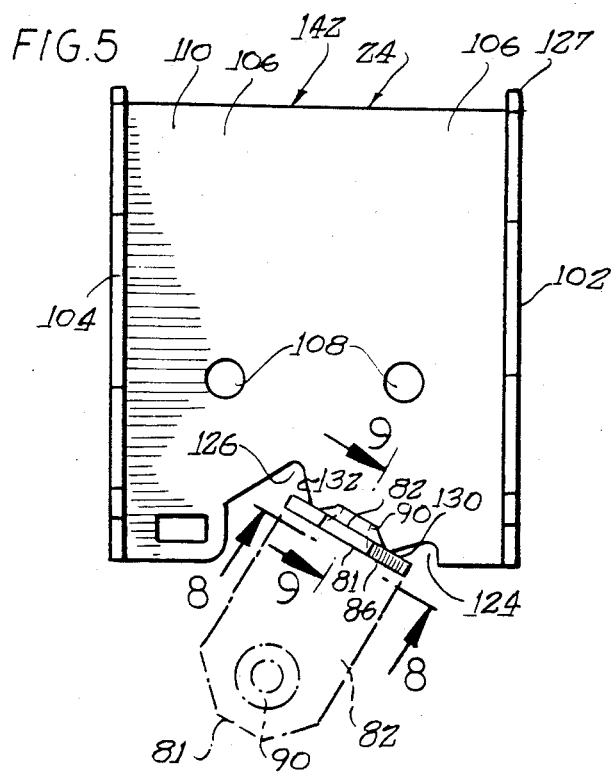
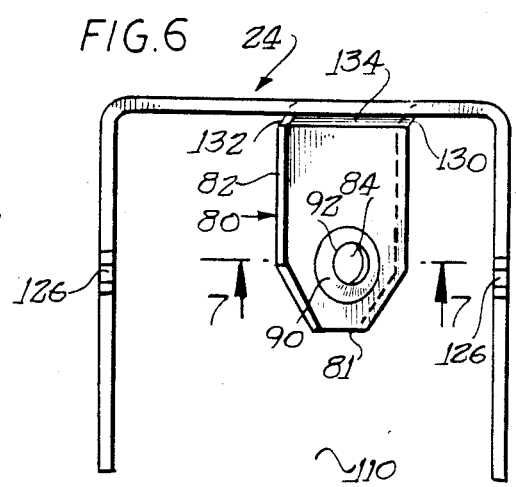
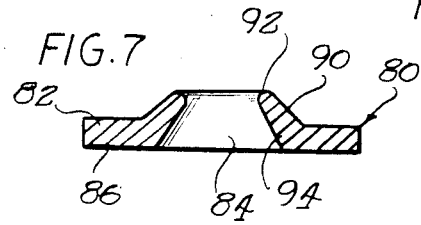
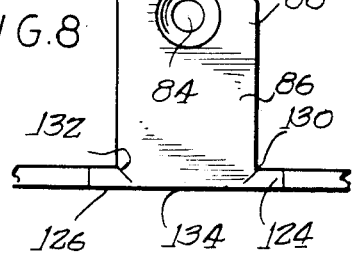
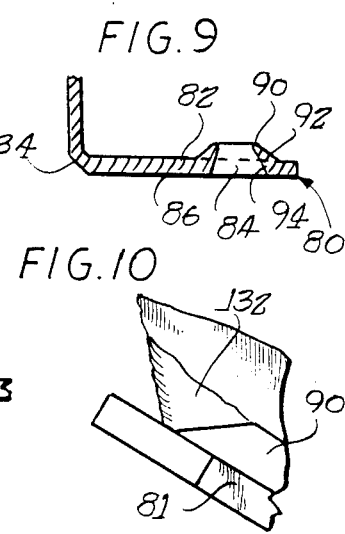

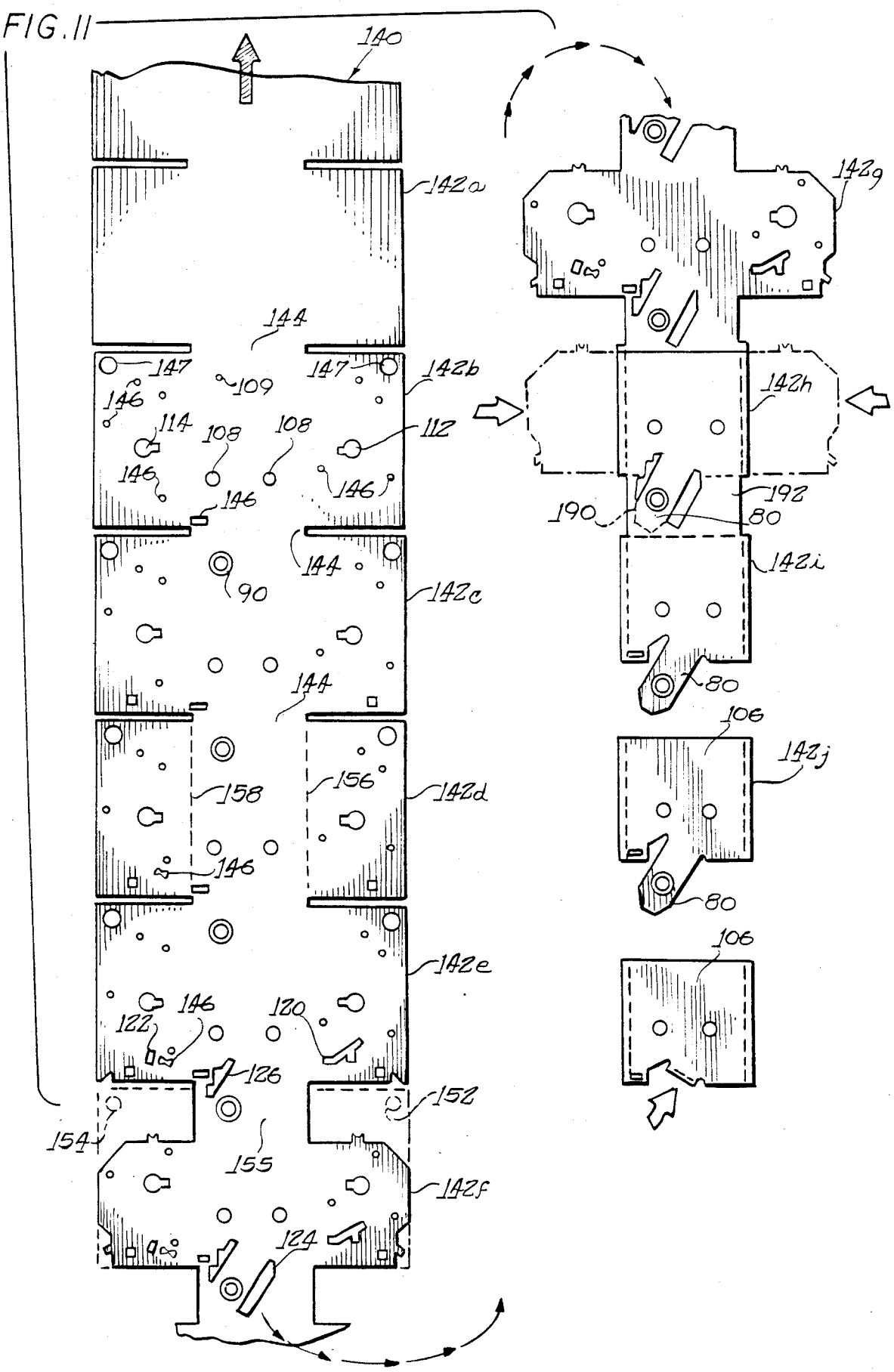

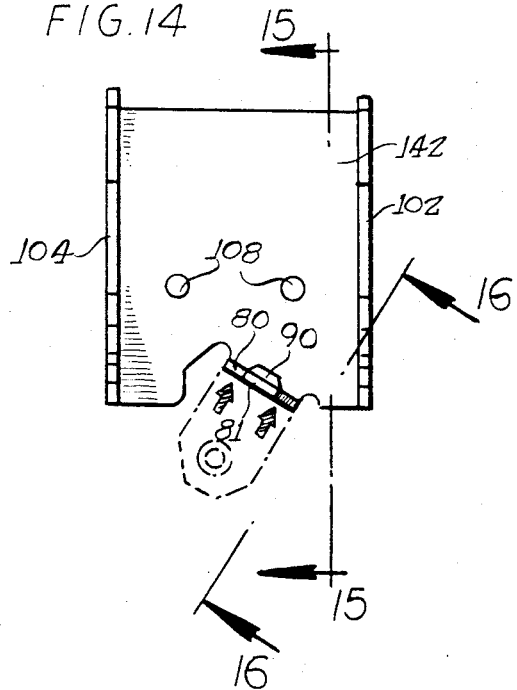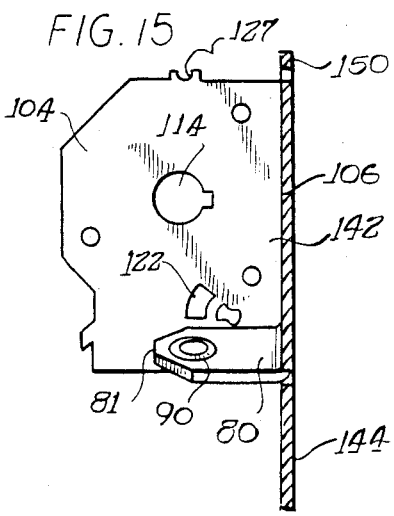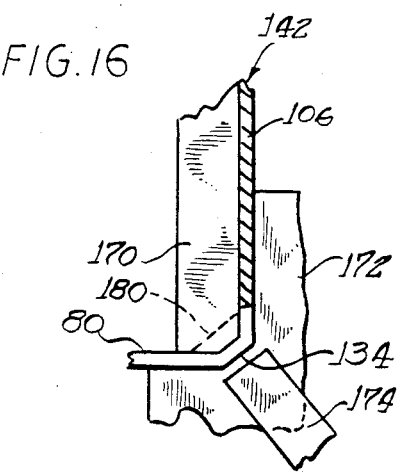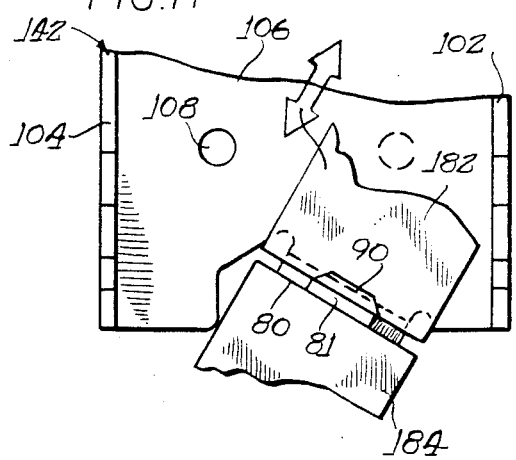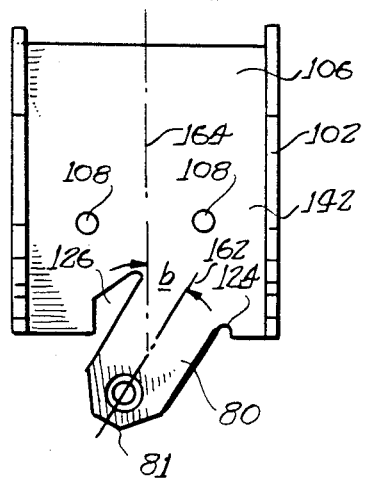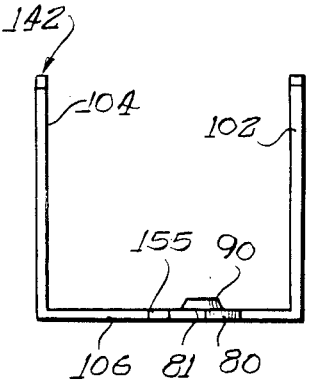

SAFETY BELT RETRACTOR AND METHOD OF MANUFACTURE

BACKGROUND OF THE INVENTION

1. Field of the Invention

The present invention relates generally to inertia type seat belt retractors and more particularly to an improved support for the inertia sensitive actuating system for such retractors.

2. Description of the Related Art

Locking retractors for safety belts having inertia weight actuators are responsive to acceleration forces applied to the retractor by the vehicle in which the retractor is mounted. In particular, the actuating system is sensitive to forces acting on a frame affixed to the vehicle so that the retractor receives the same acceleration forces as the vehicle. The inertia actuating system typically moves a locking bar or pawl member between a detenting position blocking an unwinding rotation of the safety belt reel and a release position permitting rotation of the reel. The safety belt is wound about a reel that is mounted on a shaft which is secured to the sidewalls of the retractor frame. The pawl is pivotally supported on the retractor frame sidewalls.

One type of inertia sensitive actuating system includes a pendulum supported by a mounting plate having end portions affixed to the retractor frame. The mountings of the reel shaft, the pawl pivot axis, and the pendulum support plate must be closely controlled so as to provide a consistent dimensional relationship therebetween, assuring a dependable and consistent functioning of the inertia lock of the retractor when a vehicle is subjected to acceleration or deceleration forces.

Heretofore, the support plate for the pendulum weight has been molded as a separate part, apart from the retractor frame, in the manner disclosed in reissue U.S. Pat. No. 29,688, reissued July 4, 1978. The pendulum support plate disclosed in that patent comprises part of a stirrup-shaped or U-shaped subassembly comprising three walls, the middle one of which supports the pendulum plate. Alternatively, commonly assigned U.S. Pat. No. 4,166,592 issued Sep. 4, 1979, describes a pendulum support plate having slotted ends received in apertures in the retractor frame sidewalls.

With the above arrangements, the desired dimensional relationship between the reel shaft, the pawl pivot axis and the pendulum support plate may vary somewhat, and such variance is typically detected at a quality control station during assembly of the retractor. It is known, for example, to provide at such station, a clip-like shim or adjusting device on the pawl, by which the relative positioning of the pawl and pendulum support plate may be adjusted to achieve the desired dimensional relationship.

As those familiar with the art will appreciate, seat belt retractors are supplied to the automobile industry in relative large quantities, ad are therefore most economically manufactured using mass production techniques. Given the relative large economy of scale involved, even relatively small savings per unit can result in significant savings to a retractor manufacturer, throughout the production run of a seat belt retractor. As mentioned above, separate support plates have been provided for mounting the inertia pendulum weight. In general, it is desirable to reduce the number of components required for a retractor assembly so as to achieve a savings in inventory costs, and to reduce scheduling problems with a separate manufacturing department or outside vendor for the support plate. Further, assembly of the pendulum support plate as a separate part requires additional labor, typically performed at a work station located on the retractor assembly line.

SUMMARY OF THE INVENTION

It is an object of the present invention to provide a new and improved vehicle-sensitive locking retractor.

Another object of the invention is to provide an improved method for constructing a vehicle-sensitive retractor including an improved method of constructing the pendulum support plate part thereof.

These and other objects of the present invention which will become apparent from studying the appended description taken in connection with the accompanying drawings are provided in a vehicle sensitive seat belt retractor comprising a frame, a reel having a safety belt thereon, reel mounting means for rotatably mounting said reel on said frame in a first direction to unwind the belt from the reel, ratchet means connected to said reel to rotate therewith and having a plurality of ratchet teeth thereon, and pawl means for engagement with said ratchet teeth and moveable from an inoperative position spaced from said ratchet teeth to a blocking position engaging at least one ratchet tooth so as to block the rotation of said reel associated with unwinding of the belt from said reel. According to principles of the present invention, an improved means for urging said pawl means into engagement with said at least one ratchet tooth is provided, comprising:

said frame including a plurality of walls forming a reel-receiving cavity;

said reel mounting means including a support shaft supported by the walls of said frame means said pawl means including means for mounting to the walls of said frame means at a fixed position with respect to said reel support shaft;

an inertia weight for urging said pawl means toward said blocking position when subjected to external forces;

a pawl-engaging member including a shaft having lower end connected to said weight and an upper end about which said pawl-engaging member is moved into and out of engagement with said pawl means; and a support plate integrally formed with and extending from a wall of said frame, said support plate having an aperture adjacent said pawl means through which said shaft extends, with said bearing surface on the upper side of said support plate and said weight on the lower side of said plate;

whereby said ratchet means, said pawl means and said pawl-engaging member are fixed in position with respect to each other for defined cooperation therebetween when said inertia weight is dislocated by forces imparted thereto by said vehicle.

Other objects according to the resent invention are provided in a method of making a seat belt retractor having a reel with a safety belt thereon, a support shaft mounting said reel for rotating in a first direction to wind the belt on the reel and for rotating in the opposite direction with unwinding of the belt from the reel, means biasing said reel to rotate in the direction to wind said belt thereon, ratchet means connected to said reel to rotate therewith and having a plurality of teeth thereon, a pawl means having a nose for engagement with said ratchet teeth and being moveable from an inoperative position spaced from said ratchet means to a blocking position to engage an abutment wall on a ratchet tooth and to block the rotation of said reel and to block unwinding of the belt from said reel, and an inertia weight for actuating said pawl means toward said blocking position. The method comprises the steps of:

providing a metal sheet;

stamping said sheet to form a mounting frame having a plurality of sidewalls and a support plate integrally formed with and outwardly extending from at least one of said sidewalls;

forming a plurality of apertures for mounting said reel support shaft and said pawl means;

notching said frame adjacent said support plate so as to form inwardly extending stress-relieving notches;

forming said annular bearing seat by stamping said support plate;

bending said support plate so as to displace said support plate from the wall from which it extends in two mutually orthogonal directions; and mounting said inertia means in said bearing seat;

whereby said reel supporting shaft, said pawl means and said inertia member are positioned by said frame to control the cooperation therebetween.

BRIEF DESCRIPTION OF THE DRAWINGS

In the drawings, wherein like elements are referenced alike,

FIG. 1 is a plan view of a seat belt retractor illustrating aspects according to the present invention;

FIG. 2 is a side elevational view of the retractor of FIG. 1;

FIG. 3 is a side elevational view of the frame of the retractor of FIG. 2;

FIG. 4 is an elevational view of an opposing side of the retractor frame;

FIG. 5 is an elevational view of the retractor frame;

FIG. 6 is a top plan view of the retractor frame;

FIG. 7 is a fragmentary cross-sectional view of the bearing seat portion of the retractor frame, taken along the line 7—7 of FIG. 6;

FIG. 8 is a plan view illustrating the bearing seat, taken along the line 8—8 of FIG. 5;

FIG. 9 is a fragmentary cross-sectional view taken along the line 9—9 of FIG. 5;

FIG. 10 is a fragmentary perspective view showing a gusset reinforcing the bend between the intermediate wall and support plate;

FIG. 11 is a plan view of a metal blank being progressively formed according to a method illustrating other aspects of the present invention;

FIG. 12 is an elevational view of the retractor blank prior to forming the bearing seat portion;

FIG. 13 is an end view showing the retractor frame blank of FIG. 12;

FIG. 14 is an elevational view of a retractor frame blank showing formation of the support plate portion thereof;

FIG. 15 is a fragmentary cross-sectional elevational view of the retractor frame blank of FIG. 14;

FIG. 16 shows the striking of reinforcing gussets along the bend line joining the support plate to the intermediate wall; and FIG. 17 is a fragmentary front elevational view of the retractor frame blank of FIG. 16.

BRIEF DESCRIPTION OF THE PREFERRED EMBODIMENT

Referring now to the drawings, and initially to FIGS. 1-10, a seat belt retractor assembly is generally indicated at 10. The retractor assembly includes a flexible safety belt 12 which is paid out from and retracted into a retractor mechanism. Portions of the safety belt extending from the retractor mechanism are protected by a plastic sheath 14. The mechanism operates in a known manner to restrain passengers when seated in a vehicle for travel therewith, and which relaxes to allow the passengers to fit the safety belt about their person.

Referring to FIG. 2, the retractor mechanism is mounted to a vehicle support 16 by rivets 18 or the like fasteners. The seat belt retractor assembly, when mounted to a vehicle, is inclined from the position illustrated in FIG. 1, being tilted in a counterclockwise direction by an angular displacement of approximately 30°, as will become evident from further detailed description herein.

The safety belt 12 is wound about a reel 20 with overlapping coils of the safety belt being built up on the reel as the belt is retracted. The reel 20 and the remainder of the retractor mechanism is supported by a metal frame generally indicated at 24. The frame is illustrated in its entirety in FIGS. 3-6, and portions of the frame are illustrated in greater detail in FIGS. 7-10. As will be seen herein, FIG. 11 illustrates the progressive formation of the frame 24 according to an inventive method carried out according to other aspects of the present invention.

The reel 20 is mounted on a support shaft 26 for rotation therewith. As will be seen, the ends of the shaft are rotatively mounted to frame 24. A bias means, preferably in the form of a coil spring is housed in a cover 28 which is located at one side of the retractor assembly. The spring within cover 28 biases the shaft 26 and hence the reel 20 attach thereto for rotation in a direction which retracts the safety belt 12, winding the belt about reel 20, for storage within the retractor assembly.

Ratchet wheels 30, 32 are mounted at opposed ends of shaft 26 and rotate therewith when the safety belt is either paid out or taken up in the retractor assembly. The ratchet wheels 30, 32 include a plurality of ratchet teeth 34 having blocking faces 36 which, as will be seen, are presented to a locking bar or pawl means 38 which blocks the reel from unwinding. The reel 20, pawl 38 and the mechanism associated therewith is protected by a plastic cover 40 secured to frame 24 by tangs 127, located at upper portions of the frame sidewalls.

Referring again to FIGS. 1 and 2, the locking bar or pawl 38 is mounted at its ends to frame 24 for movement, preferably a rotating or rolling movement about a longitudinal axis thereof. Pawl 38 includes a tooth or edge 46 which, when actuated, is displaced in an upward direction so as to engage the blocking faces 36 of the ratchet teeth. Actuating means for displacing pawl 38 are generally indicated at 50 and include an inertia weight 52. A pawl-engaging member generally indicated at 54 includes a shaft 56 having a lower end 58 received in a central bore of an inertia weight 52 and secured thereto with a threaded engagement. The pawl-engaging member 54 further includes an enlarged head 60 at its upper end. The head 60 has a lower bearing surface 62 and an opposed, upper, pawl-engaging surface 64.

If desired, the upper surface 64 can directly engage pawl 38. In the preferred embodiment, however, a finger 68 is struck out from pawl 38 in a generally downward direction so that the lower surface thereof rests against or is positioned immediately adjacent pawl-engaging surface 64 of the pawl-engaging member 54. The finger 68 is particularly advantageous in allowing the retractor assembly 10 to be tilted at an angle to the longitudinal axis of safety belt 12. Referring again to FIG. 1, the axis of belt 12 is indicated at 70 while the axis of shaft 56, which preferably is oriented in a generally vertical direction when the seat belt retractor is placed in operation, is indicated at 72. A line 74 is illustrated intersecting the axis 70 and the angle $\underline{a}$ between lines 70, 74 is generally an acute angle. By way of example and not limitation, the angular offset $\underline{a}$ in the preferred embodiment is approximately equal to 30°. The finger 68 is struck out so as to lie generally perpendicular to the axis 72 of shaft 56, and is thereby disposed in a generally horizontal plane when the seat belt retractor assembly is placed in operation.

The pawl-engaging member 54 is deflected, preferably with a swinging motion, in response to acceleration or declaration forces applied to the inertia weight 52. Further descriptions of the operation of the pawl-engaging member are described in commonly assigned U.S. Pat. No. 4,166,592, the disclosure of which is herein incorporated by reference. A support plate generally indicated at 80 extends from retractor frame 24 and is oriented so as to lie in a generally horizontal plane when the retractor assembly 10 is placed in operation. The support plate 80 includes an upper surface 82 facing the bearing surface 62 of pawl-engaging member 54 and an opposed lower surface 86 which faces the inertia weight 52.

As can be seen most clearly in FIGS. 6 and 8, the support plate 80 defines an aperture 84 for receiving the shaft 56 of pawl-engaging member 54 which, preferably is inserted therethrough during fabrication of the retractor assembly. In operation, the inertia weight 52 produces a downward force on the bearing surface 62 which rests against the support plate 80.

As mentioned above, the pawl-engaging member 54 tilts or rocks in operation to displace the finger 68 and hence, the pawl 38 from which the finger extends. It is important that the displacement of the pawl-engaging member 54 be smooth and reliable. Accordingly, it is desirable to reduce as much as possible, any friction between the pawl-engaging member bearing surface 62 and the upper surface 82 of support plate 80. Accordingly, there is provided a bearing seat 90 having an upper surface 92 against which the bearing surface 62 rests. As can be seen in FIG. 7, the bearing seat 90 preferably comprises a truncated conical ring having a conical interior bore defined by its interior wall 94. In the preferred embodiment, the interior wall 94 is enlarged adjacent the lower support plate surface 86, compared to the cross-sectional dimensions of shaft 56. The upper edge 92 of the bearing seat is rounded in the manner illustrated in FIG. 7.

As can be seen most clearly in FIG. 1, the upper end of stem 56, that portion of the stem mating with the bearing surface 62, is enlarged with an upwardly diverging, preferably truncated conical, shape. The upper end of stem 56 cooperates with the rounded upper surface 92 of the bearing seat to provide a low friction engagement therewith, when the inertia weight 52 is displaced from a rest position, thereby tilting or rocking the stem 56. When the stem is swung from a normal position, the enlarged head 60 of the pawl-engaging member 54 is displaced from a horizontal plane and the bearing surface 62 is inclined at an angle to the support plate 80. This sequence of movements occurs as the bearing surface 62 rolls or rocks about the upper end 92 of bearing seat.

The displacement of stem 56 swings the upper pawl-engaging surface 64 of the pawl-engaging member to raise the pawl finger 68. This in turn causes the pawl 38 to rotate about its opposed pivotal mounting ears 98, so as to raise the edge 46 thereof into the path of the ratchet teeth 34, and in particular the blocking faces 36 thereof, thus preventing an unwinding of the safety belt 12 from reel 20. Further details concerning the operation of the actuator system 50 and its interaction with a pawl member, such as the pawl 38 can be found in commonly assigned U.S. Pat. Nos. 4,124,175; 4,166,592; and 4,428,600, the disclosures of which are herein incorporated by reference.

As mentioned above, the actuator means 50, the pawl 38 and the reel 20 including the ratchet wheels 32, 30 are mounted to a common frame 24. With particular reference to FIGS. 3-10 the frame 24, constructed according to principles of the present invention, offers a number of advantages heretofore unattainable in prior art retractor systems. In the preferred embodiment, the retractor frame 24 is formed from a single piece of sheet metal and includes the support plate 80, integrally formed therewith. The retractor frame 24 includes a pair of opposed sidewalls 102, 104 disposed on either side of an intermediate wall 106. Intermediate wall 106 includes a pair of apertures 108 to receive rivet fasteners 18, for securing the retractor assembly to the vehicle support 16. As will be seen herein, the preferred method of making the retractor frame 24 includes bending the sidewalls 102, 104 at generally right angles to the intermediate wall 106 so as to form a U-shaped member enclosing an interior 110 for receiving the safety belt, reel, actuator means, and the pawl, as wall as other components of the retractor mechanism.

Referring to FIGS. 3 and 4, central apertures 112, 114 receive opposed ends of the reel-mounting shaft 26 to provide a rotational support therefor. In the preferred embodiment, bearing cups 116 are received in the apertures 112, 114 to reduce the friction of the rotational mounting. The sidewalls 102, 104 further include arcuate cutouts 120, 122 which receive the opposed mounting ears 98 located at the ends of pawl 38. The arcuate slots 120, 122 guide the pawl 38 as the mating edge 46 thereof is raised into contact with the ratchet teeth. A number of other holes and apertures are formed in the sidewalls and intermediate wall of the retractor frame. In addition, mounting tangs 127 are formed at the upper ends of sidewalls 102, 104 to aid in securing the plastic cover 40 to the retractor frame.

Referring to FIG. 5, the lower end of retractor frame 24 includes a pair of notches 124, 126 which "clear out" the intermediate wall 106, in preparation for forming the support plate 80. As will be seen, the notches 124, 126 relieve stress in the middle wall 106 when the lower portion of the frame is worked to form, bend and reinforce the support plate 80.

According to one feature of the present invention, the axis of the support plate 80 is displaced from the axis of the middle wall 106 by the angle $\underline{a}$ as described above with reference to FIG. 1. In the preferred embodiment, the support plate 80 is generally planar and is formed at generally a right angle to the plane of middle wall 106. Thus, from the perspective of FIG. 6, the support plate 80 is formed at a compound angle relative to the axes of the sidewalls and middle wall of the retractor frame. For the reasons pointed out above, the compound displacement of support plate 80 relative to the remainder of the retractor frame is important to insure proper operation of the pawl 38 and the actuator means 50 and to thereby insure a reliable locking engagement of the supply reel 20 in a manner so as to reduce play in the retractor mechanism which, in certain circumstances might otherwise result in small amounts of payout of the safety belt 12. For example, the angular position of support plate 80 determines the angle of contact between the pawl-engaging surface 64 of pawl-engaging member 54 and the finger 63 of pawl 38. The angular position of support plate 80 relative to the remainder of the retractor frame also determines the spacing between the pawl-engaging surface 64 and the pawl finger 68 when the retractor actuator means is normally positioned. These relative relationships between the support plate 80 and the remainder of retractor frame 24 determine the positioning of the remaining retractor members and directly affect the sensitivity and speed of response of the locking features of the retractor mechanism to acceleration or a deceleration forces experienced by the vehicle to which the retractor mechanism is mounted.

Manufacturers of seat belt retractors find it convenient to separately manufacture various components of the retractor assembly. For example, certain economies of manufacture can be realized if a number of retractor frames are fabricated ahead of time, prior to a final assembly operation. A retractor frame constructed according to principles of the present invention has a number of features which maintain a precise orientation of the cooperating components of the retractor mechanism, thus ensuring a well-defined reliable performance. For example, the support plate 80 is disposed within the cavity 110, being at least partially shielded by the sidewalls 102, 104 and the middle wall 106. As can be seen in FIG. 6, when fully formed, the support plate 80 is shorter than the sidewalls 102, 104 and thus the free end 81 of the support plate is at least in some measure protected thereby.

As another feature according to the present invention, the precise angular orientation of support plate 80 relative to the remainder of the retractor frame is provided by the gussets 130, 132 which are "hit" or struck into the bend or fold line 34 joining the support plate to the middle wall 106. According to one aspect of the present invention, the gussets 130, 132 are formed at the fold line 134, adjacent the lateral sides of the support plate. The gussets 130, 132 rigidify the fold line joining the support plate to the middle wall, increasing the strength thereof so as to withstand any deforming forces inadvertently applied thereto.

As those skilled in the mass production of stamped metal components are aware, it is frequently more economical to store the metal components in a "loose" condition, or bulk storage, where the components are not maintained in any particular orientation relative to one another but share a common storage cavity. During transit of such storage containers, the components therein are bounced against each other and accordingly the potential for deformation of the angular orientation of the support plate exists. It has been found that the gussets according to the present invention, which are simply and economically formed without requiring additional components or pieces, offer adequate strength to resist such deformation.

Referring now to FIGS. 11-17, additional features of the retractor and the method of its fabrication will be described. A continuous metal strip 140 is illustrated in FIG. 11. Although blanks for the retractor frame could be formed one at a time, a method of fabrication according to principles of the present invention preferably uses automated progressive die fabrication techniques wherein a serial succession of multiple retractor frame blanks are formed. FIG. 11 illustrates an initial stage of the preferred method wherein retractor frame blanks 142 are formed from the metal strip 140, being joined together by intermediate portions 144. The tab portions 144 are formed in what will become the tail portion 155 of the retractor frame. For ease of reference, the retractor frame blanks will be identified with alpha suffixes a-j which refer to the sequence of the blanks as they appear in FIG. 11.

The retractor frame blank 142b is punched to form a variety of apertures 146 therein, including apertures 147 which are convenient for moving the metal blanks 142 through a progression of die-forming stages. During this initial die forming step, the shaft-receiving apertures 112, 114 are formed in the metal blank 142b, along with apertures 108 which receive the rivet fasteners 18. A pilot hole 109 is also punched at the upper end of blank 142b. Although at this stage of fabrication, the pilot hole 109 is visually associated with blank 142b, the pilot hole and the surrounding material will be associated with the retractor blank 142a, located thereabove. This will become clear when the clearing step performed on blank 142f is discussed.

In retractor blank 142c the pilot hole 109 is developed into the bearing seat 90 which supports the inertia weight. The location of the bearing seat, relative to the other operating portions of the retractor, comprises a critical alignment feature which must be carefully maintained throughout manufacture of the retractor, and particularly the retractor frame therefor. Accordingly, it is generally referred that the bearing seat 90 be formed prior to the clearing notches 124, 126 (which are punched in the retractor frame blanks 142f and 142e, respectively) since the clearing notches 124, 126 which to a large extent, determine the location of the fold line 134 joining the intermediate wall 106 and support plate 80 together, weakens the immediate area of the blank. Further, it is generally preferred that bearing seat 90 be formed in support plate 80 while the retractor frame blank assumes a generally planar configuration so as to provide ample room for tooling which supports the support plate during formation of the bearing seat, thus preventing distortion of the support plate which could later result in a misalignment of the operating components of a working retractor. Further development of the bearing seat will be described below with reference to FIGS. 12-17.

Various additional apertures are formed in the succeeding blanks, such as blank 142d. Bend lines 156, 158 between intermediate wall 16 and end walls 102, 104, respectively, are also shown in blank 142d. Bending of the endwalls will be described further with reference to blank 142h.

Apertures 120, 122 for receiving the pawl are added in blank 142e, along with a first clearing notch 126 which, as will be seen, defines one edge of support plate 80. The corner portions 152, 154 of the retractor blank are removed to form a tail portion 155. The tail portion 155 is associated with retractor blank 142e, and as will now be seen, the tail portion 155 is cleared out to form the support plate for the retractor frame whose major body portions are contained in blank 142e.

In retractor blank 142f, a second clearing notch 124 is formed to define a second opposed edge of a support plate 80 associated with the blank. Lower corner portions 157, 159 are also cleared from the blank 142f, and the distinguishing outline of the retractor sidewalls is now evident.

With additional reference to the bottom view of FIG. 12, with the clearing notches 124, 126 and the bearing seat 90 fully formed in the tail portion, the opposed ends of the retractor frame blank 142h are bent in a downward direction along the aforementioned bend lines 156, 158. The downturned ends of the retractor frame blank comprise the sidewalls 102, 104 and the remaining portion of the blank, lying in the plane of the metal strip 140, comprises the intermediate wall 106. A plan view of the partially formed retractor frame blank is illustrated in FIG. 13. As can be seen therein, the tail portion 155 remains in the original planar orientation with the metal strip 140. The phantom line 190 of the retractor blank 142h of FIG. 11 indicates the outline of the support plate which remains after the part 192 is cleared from the tail portion of the blank 142h. The resulting retractor blank 142j is illustrated in greater detail in FIG. 12.

As can be seen in FIG. 12 and the remaining figures, the incompletely formed support plate 80 has a longitudinal axis 162 formed at an angle to the axis 164 of the intermediate wall 106 which extends generally parallel to the longitudinal axes of the sidewalls 102, 104. The angle is identified in FIG. 12 by the reference letter b As mentioned above, the angular offset is provided to accommodate a preferred angular offset mounting of the seat belt retractor in a vehicle. This angular offset was identified by the reference letter a with reference to FIG. 1.

Referring now to the bottom of FIG. 11 and also to the bottom plan view of FIG. 14, the support plate 80 of retractor blank 142j is struck in a generally downward direction so as to be offset from the plane of intermediate wall 106. In the preferred embodiment, support plate 80 is offset at an angle of 90° from the intermediate wall, the above-mentioned compound angular offset being achieved by the inclined angle b between the axes of the support plate and the intermediate wall, as described above with reference to FIG. 12. Thus, all that is required is to bend the support plate 80 at a right angle to the plane of the metal strip 140. FIG. 15 is a cross-sectional view showing the compound angular offset of the support plate relative to the intermediate wall 106 and the sidewall 104.

As has been mentioned above, the compound angular orientation between the bearing seat 90 and the remaining components of the seat belt retractor is important to ensure the proper cooperation between the inertia weight, pawl, and ratchet teeth of the retractor mechanism. Further, as will be seen herein, the retractor frame is separated from the adjoining retractor blanks so that it can be loosely packaged in a mass shipping container such as a parts box or the like. It is important that the compound angular orientation between the support plate and the remaining operating systems of the retractor be preserved at least during the complete manufacture of the seat belt retractor.

Because it has been found convenient to store a plurality of retractor frames in a loosely-packed container, attention has been given to rigidify the angular orientation between the support plate and the intermediate wall. It is unlikely that the axis 162 of the support plate will become shifted so as to alter its alignment with the axis 164 of the intermediate wall, due to the relatively long length of the fold line 134. Accordingly, the aforementioned gussets 130, 132 are formed at the juncture between support plate 80 and intermediate wall 106. In the preferred embodiment, the gussets are formed at the ends of fold line 134. It having been found unnecessary to provide additional gussets intermediate the ends of the fold line, although such is possible if desired.

Referring now to FIG. 16, support tooling 170, 172 engages the retractor frame blank at its interior and exterior portions, respectively. A punch 174 is then applied to the retractor frame blank at the juncture of the support plate 80 and intermediate wall 106, in the vicinity of the clearing notches 124, 125. The support tooling 170, 172 ensures that the force applied to the retractor frame blank by punch 174 will result in a deformation of the retractor frame blank, rather than a movement or displacement thereof. When formed, the gusset has a generally triangular configuration, with an upper edge extending along line 180 indicated in phantom. The gusset 132 formed at the opposed end of support plate 80 is formed in a similar manner.

In order to ensure that the desired compound angular displacement between the support plate and intermediate wall is maintained after forming of the gussets, the support plate is restruck in an optional, extra step indicated in FIG. 17. Tooling members 182, 184 are brought together so as to trap the support plate 80 therebetween, bending the support plate if necessary so as to conform to the angular orientation of the opposed faces of the tooling members. The upper tooling member 182 preferably engages the support plate 80 in that portion of the plate extending between bearing seat 90 and intermediate wall 106. If desired, however, the tool 182 could be provided with a suitable recess overlying the bearing seat so as to avoid deformation thereof when restriking the support plate. The clearance notches 124, 126 assist in the striking operation by reducing the amount of force necessary to reorient a misaligned support plate, thereby minimizing a risk of altering the remainder of the seat belt retractor frame blank during the operation.

When the retractor frame is fabricated according to the inventive method, no further operations need be performed, and a retractor frame is produced with fully formed shaft-mounting apertures, pawl mounting apertures, and a bearing seat for the inertia weight. Thus, the relative spatial and angular orientation of the various operating systems of the retractor are determined solely by the retractor frame, and those relative settings are attained in a retractor frame which resists deformation upon impact prior to final assembly and which can be bulk-packaged in an economical manner, ready for delivery to a final assembly point.

With regard to the stability of the relative orientation of the bearing seat to the remaining systems of the retractor mechanism, it was noted above that the configuration of the support plate renders the plate resistent to any misalignment about its longitudinal axis 162. With the reinforcing gussets 130, 132 in place, the support plate 80 is stabilized against deflections directed either toward or away from the intermediate wall 106. Thus, with a minimum number of economical forming steps, the support plate 80 is rendered three-dimensionally stable, thus fixing the bearing seat 90 at a well-defined location.

The retractor and method of construction, according to principles of the present invention, have been found to consistently provide a retractor mechanism having a number of close tolerances in its construction. In a commercial embodiment of the present invention, a tolerance of ±0.005 inches was consistently maintained between the actuating member 50 and the pawl member 38. More specifically, this tolerance was maintained at the closest spacing between the two members, which in the preferred embodiment, was the spacing between the upper pawl-engaging surface 60 and the lower surface 86 of support plate 80. In addition, close tolerances were also consistently maintained in the same retractors, so as to hold the closest spacing between the ratchet teeth 34 and the teeth-engaging edge of pawl 38 to within 0.040 inches tolerance. As will be readily appreciated by those skilled in the art, these tolerance dimensions are quite small, and it will be appreciated that the present invention offers significant advantages in preserving the dimensional relationships of the mounting apertures for the reel-supporting shaft, pawl member and inertia member, despite loose packaging of the retractor frames, and without requiring a final adjustment. For these and other reasons, it will now be appreciated that the present invention offers significant economies of seat belt retractor fabrication.

Referring briefly to the retractor blanks 142e, 142f of FIG. 11, those skilled in the art will readily appreciate that the shaft-receiving apertures 112, 114 and the apertures 120, 122 for receiving the pawl can be accurately and reliably positioned relative to the clearance notches 124, 126 and the remaining features of the blank which determine the configuration of support plate 80. When the reel-supporting shaft is installed in apertures 112, 114, relative spacing and orientation between the reel shaft and the bearing seat 90, and hence the inertia weight mounted therein, is assured. Further, when the locking bar is received in apertures 120, 122 a relative spacing and angular relationship is established with both the bearing seat 90 and hence the inertia weight received therein, and with the reel-supporting shaft. Further, the apertures 108 can easily and readily be readjusted, if necessary, so as to ensure a repeatable, accurate positioning of the retractor mechanism relative to the vehicle, and any model changes can be easily accommodated.

Having thus described the invention, those skilled in the art will readily perceive changes, improvements and modifications as well as adaptations to other retractors and such changes, improvements, modifications and adaptations are intended to be included herein, limited only by the scope of the hereinafter appended claims.

What is claimed is:

1. In a vehicle sensitive seat belt retractor comprising a frame, a reel having a safety belt thereon, reel mounting means for rotatably mounting said reel on said frame in a first direction to unwind the belt from the reel, ratchet means connected to said reel to rotate therewith and having a plurality of ratchet teeth thereon, and pawl means for engagement with said ratchet teeth and moveable from an inoperative position engaging at least one ratchet tooth so as to block the rotation of said reel associated with unwinding of the belt from said reel, an improved means for urging said pawl means into engagement with said at least one ratchet tooth, comprising:

said frame including a plurality of walls forming a reel-receiving cavity;

said reel mounting means including a support shaft supported by the walls of said frame means said pawl means including means for mounting to the walls of said frame means at a fixed position with respect to said reel support shaft;

an inertia means having an end for actuating said pawl means toward said blocking position when subjected to external forces;

a support plate integrally formed with and struck from and extending from a wall of said frame, said support plate defining an aperture adjacent said pawl means through which the end of the inertia means extends and locating the end of the inertia means at a precise predetermined position relative to the pawl means; said support plate having an outer free end and having a fold line with its associated wall of the frame, said support plate being at a compound angle with respect to the plane of the wall of the retractor, and gusset walls formed at the fold line in the support plate and in the retractor wall and disposed at angle to the retractor wall and to the support plate to stabilize the support plate against deflection toward or away from the wall and a change in either one of the compound angles.

2. The seat belt retractor of claim 1 wherein said support plate further includes bearing seat means on the upper surface thereof, said bearing seat means having a central passageway communicating with the aperture of said support plate for passage of said shaft therethrough.

3. The seat belt retractor of claim 1 wherein said bearing seat means comprises an annular ring raised above the surface of said support plate.

4. The seat belt retractor of claim 3 wherein the upper end of said inertia means includes a shaft with an upwardly diverging bearing surface for engagement with said annular ring.

5. The seat belt retractor of claim 1 in which the gussets are formed at the opposite ends of the fold line and are triangular in shape.

6. The seat belt retractor of claim 1 wherein said plate is generally planar and is displaced from said frame wall at the compound angle, including a rotation of the plate about a line lying in the plane of said plate.

7. The seat belt retractor of claim 1 wherein said pawl means includes a locking bar having a downwardly extending central portion engaging the upper end of said pawl-engaging member.

8. The seat belt retractor of claim 1 wherein said pawl means includes a body with a finger struck out therefrom so as to extend toward said pawl-engaging member.

9. The seat belt retractor of claim 1 wherein said pawl means is located between said reel support shaft and said pawl-engaging member with said support plate cantilevered from at least one of said frame sidewalls so as to lie entirely within said cavity, and said aperture located adjacent a free end of the support plate.

10. In a method of making a seat belt retractor having a reel with a safety belt thereon, a support shaft mounting said reel for rotating in a first direction to wind the belt on the reel and for rotating in the opposite direction with unwinding of the belt from the reel, means biassing said reel to rotate in the direction to wind said belt thereon, ratchet means connected to said reel to rotate therewith and having a plurality of teeth thereon, a pawl means having a nose for engagement with said ratchet teeth and being moveable from an inoperative position spaced from said ratchet means to a blocking position to engage an abutment wall on a ratchet tooth and to block the rotation of said reel and to block unwinding of the belt from said reel, and an inertia weight for actuating said pawl means toward said blocking position, the improvement comprising the steps of:

providing a metal sheet;

stamping said sheet to form a mounting frame having a plurality of sidewalls and a support plate integrally formed with and outwardly extending from at least one of said sidewalls;

forming a plurality of apertures for mounting said reel support shaft and said pawl means;

forming an annular bearing seat by stamping said support plate;

bending said support plate at a fold line on the frame sidewall so as to displace said support plate from the wall from which it extends in a predetermined angle and a predetermined spacing from a mounting axis for said pawl means;

indenting the metal at the fold line to form gussets to rigidify the support plate to maintain a precise preselected, angular relationship to the frame sidewall;

restriking the support plate after formation of the gussets to assure said precise, preselected angular relationship; and mounting said inertia means in said bearing seat whereby said reel supporting shaft, said pawl means and said inertia member are positioned by said frame to control the cooperation therebetween.

11. The method of claim 10 wherein said step of bending said support plate comprises the step of bending said support plate along a line displaced at an acute angle from an axis of said frame means.

12. The method of claim 10 further comprising the step of notching said frame adjacent said support plate so as to form inwardly extending stress-relieving notches.

* * * * *

UNITED STATES PATENT AND TRADEMARK OFFICE
CERTIFICATE OF CORRECTION

PATENT NO. : 4,984,752

DATED : January 15, 1991

INVENTOR(S) : Samuel M. Marrs, et al.

It is certified that error appears in the above-identified patent and that said Letters Patent is hereby corrected as shown below:

Column 1, Line 58, change "ad" to --and--.

Column 2, Line 36, after "means" insert a semicolon.

Column 4, Line 20, after "displacement" insert --a--.

Column 5, Line 24, change "declaration" to --deceleration--.

Column 5, Line 64, after "conical" delete the comma (second occurrence).

Column 6, Line 40, change "wall" to --well--.

Column 7, Line 26, delete "a".

Column 9, Line 17, after "158" insert a period.

Column 9, Line 35, after "b" insert a period.

UNITED STATES PATENT AND TRADEMARK OFFICE
CERTIFICATE OF CORRECTION

PATENT NO. : 4,984,752

DATED : January 15, 1991

INVENTOR(S) : Samuel M. Marrs, et al.

It is certified that error appears in the above-identified patent and that said Letters Patent is hereby corrected as shown below:

Column 11, Line 65, after "position" insert --spaced from said ratchet teeth to a blocking position--.

Column 12, Line 6, after "means" insert a semicolon.

Column 14, Line 9, after "and" make new paragraph beginning with "mounting".

Signed and Sealed this

Twenty-eighth Day of July, 1992

Attest:

DOUGLAS B. COMER

*Attesting Officer*     Acting Commissioner of Patents and Trademarks